No. 806,472. PATENTED DEC. 5, 1905.
A. D. JEFFREY.
MEANS FOR MAKING ARTICLES OF PLASTIC MATERIAL.
APPLICATION FILED APR. 12, 1904.
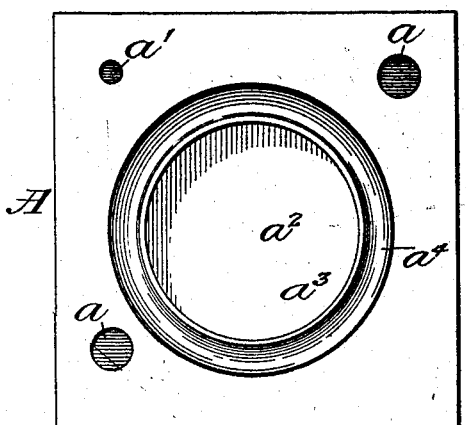
Fig. 1
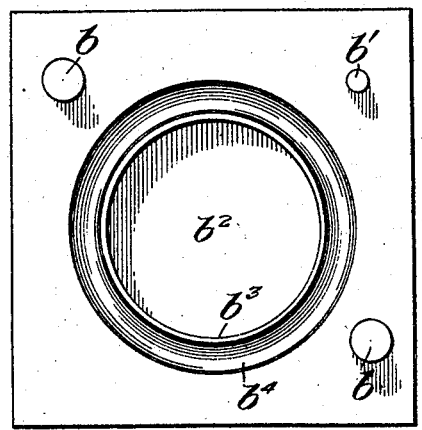
Fig. 2
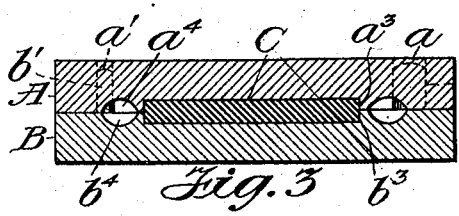
Fig. 3
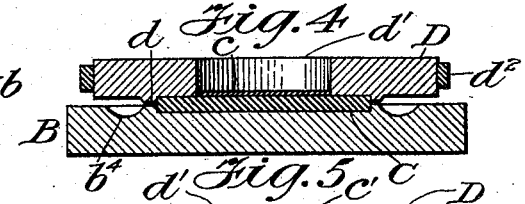
Fig. 4
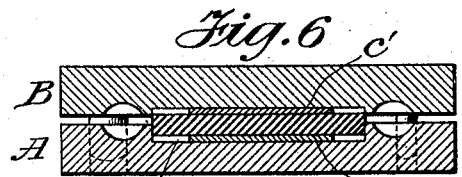
Fig. 6
Fig. 5
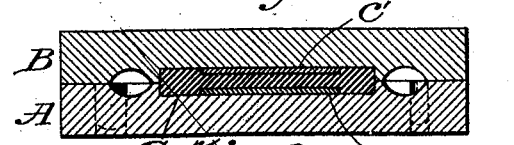
Fig. 7
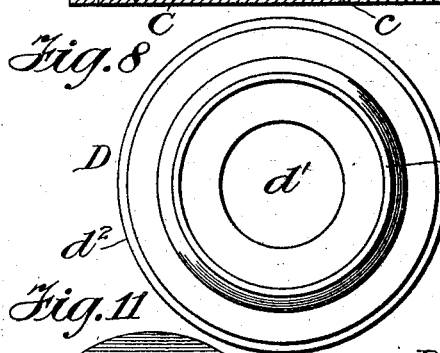
Fig. 8
Fig. 11
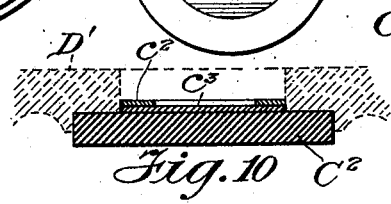
Fig. 9
Fig. 10
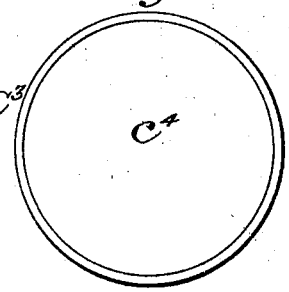
Fig. 13
Fig. 12
Witnesses
Chas. F. Clagett
Chas. L. Wolf
Inventor
Albert D. Jeffrey
By his Attorney
Charles A. Stephens

UNITED STATES PATENT OFFICE.

ALBERT D. JEFFREY, OF NEW YORK, N. Y., ASSIGNOR TO WILLIAM L. ETTINGER, OF NEW YORK, N. Y.

MEANS FOR MAKING ARTICLES OF PLASTIC MATERIAL.

No. 806,472. Specification of Letters Patent. Patented Dec. 5, 1905.

Application filed April 12, 1904. Serial No. 202,817.

*To all whom it may concern:*

Be it known that I, ALBERT D. JEFFREY, a citizen of the United States, and a resident of Greater New York, borough of Brooklyn, in the county of Kings and State of New York, have invented certain new and useful Improvements in Means for Making Articles of Plastic Material, of which the following is a specification.

The present invention relates to means for making articles of plastic material, and more particularly articles of the character described, embodying an inlay section or sections.

The object of the invention is to attain the accurate, intimate, and positive embodiment of the inlay section or sections in a simple and efficient manner and under conditions resulting in a highly-finished and desirable product. I have set forth my improvements in connection with the manufacture of disks of plastic material designed to serve as game-counters, and each having inlay-sections in its opposite faces.

With the above purposes in view the invention primarily involves a gage-ring of novel construction adapted for service with an appropriate mold part, whereby the inlay-section may be accurately positioned upon a counter body or blank and such body or blank, with its adjusted inlay-section, then subjected to heat and pressure to nicely incorporate the inlay-section in a finished manner and the exposed surface of the inlay-section be flush with the contiguous surface of the counter.

The employment of the novel gage-ring in connection with an appropriate mold admits of the accurate positioning of the inlay-sections at both sides of the body or blank prior to the operation of incorporating such sections by heat and pressure, as above intimated.

In the accompanying drawings, forming part of this specification, Figure 1 is an inverted plan view, and Fig. 2 a top plan view, of the upper and lower parts of a form of mold employed in connection with my invention. Fig. 3 is a vertical sectional view of said mold and illustrating the formation of a counter body or blank. Fig. 4 is a somewhat similar view illustrating the application of the novel gage-ring for positioning the inlay-section at one side. Fig. 5 is a similar view illustrating the condition of the parts in positioning another inlay-section at the opposite side of the counter body or blank. Fig. 6 is a vertical sectional view showing the position of the mold and contents prior to the completion of the counter. Fig. 7 is a similar view illustrating the condition of the counter at the final stage of its manufacture. Fig. 8 is an inverted plan view of the gage-ring. Fig. 9 is a view illustrating generally the resulting game-counter. Fig. 10 is a detail sectional view illustrating the application of an inlay-section of compound character for the purpose of securing a contrasting effect. Fig. 11 is a side view of the counter resulting from the operation generally indicated in the preceding figure. Figs. 12 and 13 are a vertical section and a side view, respectively, of a counter wherein the inlay-sections constitute facings for the article.

Similar reference characters are employed to designate corresponding parts in the several views wherein they occur.

Considering now Figs. 1 to 8, inclusive, A and B refer to the upper and lower parts of a mold to be used in the manufacture of game-counters of plastic material and in connection with my invention. The part A contains the vertical perforations $a\, a'$, located in the corner portions and adapted for the reception of the pins $b\, b'$ correspondingly on the part B to center both parts with respect to each other. These parts A B contain in their contiguous faces central depressions $a^2\, b^2$, which are defined by the annular projecting cutting edges $a^3\, b^3$, respectively, and immediately outside of which are the annular channels $a^4\, b^4$, adapted to provide a waste-cavity. Manifestly when the parts A B are appropriately fitted together the depressions $a^2\, b^2$ conjointly form a space of a capacity for the snug occupancy of the counter body or blank C. Such body or blank C may be independently formed or may be molded within the parts A B by the application of the plastic material to the depression $b^2$ and in a quantity suitable when the part A is adjusted to result in the formation of the counter-body of the desired diameter and thickness.

Whether formed independently or in the parts A B the body or blank C is located in the depression $b^2$, with a portion of such blank or body projecting above the cutting edge $b^3$ of said part, the other mold part A being removed. As thus conditioned, the novel gage-ring D, constituting an important feature of the invention, is adjusted upon the part B, such ring being integrally provided at its lower side with an annular rib $d$, the diameter of the space within the rib $d$ being such that the inner abrupt face thereof will intimately engage the periphery of the projecting portion of the counter body or blank. As will be observed by reference to Fig. 4, the depth of the rib $d$ is only such that the under surface of the ring within the area of said rib will rest upon the upper surface of the body or blank contiguous to its margin and support said ring, so that the under surface of its rib $d$ will be slightly above and clear of the cutting edge beneath, this arrangement permitting the ring to serve with different thicknesses of blanks. It will also be noted in said figure that the rib $d$ and under side of the ring external thereto are so arranged that a limited clearance is afforded for coaction with the cutting edge $b^3$ and channel $b^4$ in providing for any waste that may ensue from the pressure to which the blank is to be further subjected.

A vertical opening $d'$ in the ring is configurated to coincide with the outline of the inlay section or sections to be incorporated in the blank. The opening in the ring D is represented as being circular and adapted for the introduction of inlay-disks of corresponding contour. With the part B and gage-ring D in a heated condition sufficient for maintaining the blank C in a plastic or semiplastic condition an inlay-section $c$ is inserted through the ring-opening $d$, so that said disk will be positioned upon the upper surface of the blank. Of course the diameter of the disk $c$ will be such that it will barely be accommodated within the ring-opening, and hence it will be accurately positioned upon the blank. It may be well to here state that the inlay-disks may be of any suitable material, such as thin celluloid, and be provided with any desired ornamentation or symbol produced by printing or in any other manner. Further, the body or blank C may be celluloid or other satisfactory mastic with or without the incorporation of an adhesive, the latter adapted to become soft under the action of heat.

The inlay-section $c$ having been accurately positioned as described, the ring D is removed, which can be accomplished without disturbing the inlay-section by reason of the adhesion of the latter to the plastic or semiplastic blank surface. If it is desired to apply an inlay-section to the opposite side of the blank, the mold part A is restored relative to the part B, the mold inverted, and the part B removed. The ring D is then adjusted upon the part A and an inlay-section $c'$ introduced through the ring-opening and positioned upon the now uppermost surface of the blank. Upon the removal of the ring and further restoration of the part B the mold, with the blank and inlay-sections, will occupy the relation illustrated in Fig. 6, in which the mold parts are represented as being slightly separated by reason of the presence of the inlay-sections. Finally, by subjecting the mold while still maintaining its heated condition to pressure the inlay-sections will be forced into the blank to become intimately incorporated and embodied therein, and thus result in a game-counter with inlays in both sides flush with the counter-surfaces.

The maintenance of both the ring and mold parts in a heated condition during the several operations described prevents the cooling of the plastic body C at any time during the inlay operation. This is important, as it is well known to those familiar with the working of plastic compositions, particularly those of celluloid, that reheating affects the material so as to prevent the surface luster or finishing-polish highly desirable in articles made therefrom.

In the event of the body material including an adhesive capable of becoming softened under the action of heat the presence of a proportion of such adhesive at the body-surfaces will conduce to the retention of the inlay-disks thereon prior to the final compression. A like result can be attained by applying a similar adhesive to the under sides of the inlay-sections.

With a view of preventing the heat of the gage-ring from causing discomfort to the operator in handling such ring the latter is peripherally provided with an insulating-guard $d^2$, of felt or other material which is an indifferent conductor of heat and which permits the ring to be handled without inconvenience.

The contour and character of the inlay-sections can be widely varied. As before intimated, where such sections partake in outline the configuration of some special ornament—as, for instance, a star, crescent, anchor, triangle, or the like—the ring-opening will be similarly shaped and proportioned. Further, the sections can be conditioned to present when embedded an inner device or ornamentation, the section being cut out in the desired outline, so that when said section is pressed into the body C contrasting material will be forced into and completely occupy the cut-out portion.

Figs. 10 and 11 illustrate a manner of providing a game-counter wherein an inlay-section comprises thicknesses $c^2 c^3$ of contrasting character, the upper thickness $c^2$ being cut out to present an opening embodying the outline of the inner design to be produced. These thicknesses will preferably be secured together by gumming or otherwise to produce a composite disk; but it will be evident that they can relatively be positioned upon the body $C^2$ by successive introduction through the gage-ring $D'$, the perforated portion of which is indicated by dotted lines in Fig. 10. Consequently when the blank and disks are subjected to the final compression in the heated mold not only will the disks become properly embedded in the blank, but material of the disk $c^3$ will be forced within and completely occupy the cut-out portion of the disk $c^2$ flush with the outer surface thereof. Therefore by making the body $C^2$ of one color, the disk $c^2$ of another, and the disk $c^3$ of a third color the ultimate effect will be an inlaid article of highly-ornate appearance.

The inlay-disks may be of such diameter that when embedded they will constitute a facing for nearly the entire side surfaces of the counter, very slight portions of the latter being exposed at the margin. Figs. 12 and 13 illustrate such arrangement, the facing-disks $c^4$ $c^5$ being embedded in the body $C^2$, as indicated. It will be understood that in making the form last described the ring-opening will be of a size to accommodate the same.

From the foregoing it will be appreciated that by my improved means plastic articles of inlay or similar character can be accurately, conveniently, and expeditiously produced. Moreover, the employment of the novel gage-ring set forth results in advantages not heretofore attained in this line of manufacture.

The mold parts may have a plurality of depressions for receiving body-blanks, and a plurality of the gage-rings can be tied together to serve with such plural form of mold. Where a plurality of relatively separated or insulated inlay-sections are to be embedded in a counter-face, the gage-ring will contain correspondingly separated and configurated openings.

I do not desire to be understood as limiting myself to the precise construction and arrangement of parts shown and described, but reserve the right to all modifications within the scope of my invention.

Having now described my invention, what I claim as new, and desire to secure by Letters Patent, is—

1. In means for positioning inlay-sections in the manufacture of plastic articles, a gage containing a vertical opening corresponding in outline and plan dimensions with the inlay-section, and a heat-insulating guard carried by said gage.

2. In means for positioning inlay-sections in the manufacture of plastic articles, a gage containing a vertical opening corresponding in outline and plan dimensions with the inlay-section and having an under engaging rib, and a heat-insulating guard carried by said gage.

Signed at New York, in the county of New York and State of New York, this 30th day of March, A. D. 1904.

ALBERT D. JEFFREY.

Witnesses:
WILLIAM PAXTON,
CHAS. L. WOLF.